United States Patent [19]
Katagiri et al.

[11] Patent Number: 5,426,478
[45] Date of Patent: Jun. 20, 1995

[54] CAMERA WITH A BUILT-IN STROBE HAVING A GRIPPING SECTION AND A FINGER INTRUSION PREVENTION SCREEN

[75] Inventors: Moriya Katagiri, Hachioji; Tatsuya Suzuki, Funabashi; Hiroshi Akitake, Sagamihara; Kazuo Yamamoto, Yokohama, all of Japan

[73] Assignee: Olympus Optical Co., Ltd., Tokyo, Japan

[21] Appl. No.: 302,234

[22] Filed: Sep. 8, 1994

Related U.S. Application Data

[63] Continuation of Ser. No. 998,181, Dec. 28, 1992, abandoned.

[30] Foreign Application Priority Data

Dec. 26, 1991 [JP] Japan ................................. 3-345546
Jan. 8, 1992 [JP] Japan ................................. 4-001382

[51] Int. Cl.[6] ............................................. G03B 15/03
[52] U.S. Cl. ................................ 354/149.11; 354/219; 354/288; 354/289.1
[58] Field of Search ............ 354/145.1, 149.1, 149.11, 354/219, 266, 288, 289.1, 126, 127.1, 127.11, 127.12, 127.13

[56] References Cited

U.S. PATENT DOCUMENTS

| | | | |
|---|---|---|---|
| 4,306,792 | 12/1981 | Prochnow | 354/127.1 |
| 4,441,799 | 4/1984 | Enomoto | 354/145.1 |
| 4,500,184 | 2/1985 | Morizumi et al. | 354/149.11 |
| 4,557,574 | 12/1985 | Kohno et al. | 354/288 |
| 4,918,477 | 4/1990 | Matsuda et al. | 354/288 |

FOREIGN PATENT DOCUMENTS 63-44644 8/1988 Japan.

*Primary Examiner*—Howard B. Blankenship
*Attorney, Agent, or Firm*—Louis Weinstein

[57] ABSTRACT

A camera with a built-in strobe according to the present invention comprises a camera housing, an optical system located substantially in the center of the camera housing, a gripping section formed at an end of the camera housing in a direction that does not cross the optical axis of the optical system and is aligned in a substantially vertical direction, a release button formed above the gripping section and on the top of the camera housing, a strobe that is installed on the front of the camera between the release button and the gripping section and that lies between a finger for manipulating release and the other fingers for gripping the gripping section when the camera housing is gripped by a human hand, and a finger intrusion prevention screen that has a convex portion for preventing any of the fingers gripping the gripping section from intruding into the strobe.

55 Claims, 13 Drawing Sheets

CAMERA WITH A BUILT-IN STROBE HAVING A GRIPPING SECTION AND A FINGER INTRUSION PREVENTION SCREEN

This is a continuation of application Ser. No. 07/998,181, filed Dec. 28, 1992, now abandoned.

BACKGROUND OF THE INVENTION

1. Field of the Invention

The present invention relates to a camera, or more particularly, to a camera with a built-in strobe.

2. Related Background Art

Various models of strobe built-in type cameras have been commercialized in the past. Many models of cameras have made their debuts in recent years, wherein a zoom lens is incorporated as a means for providing sophisticated functions. In these cameras, a strobe is located at one end of a camera housing with respect to a lens barrel, and a gripping section of the camera housing and a release member are arranged at the other end of the camera housing. In a background of having determined the above arrangement of the members, an effort has been made to prevent a red-eye phenomenon by maximizing a distance d between a lens and a strobe. The red-eye phenomenon is correlated to an angle $\theta 0$ between a lens and a strobe with respect to a subject. To suppress the red-eye phenomenon, the angle $\theta$ must be increased; that is, the distance d must be increased. Examples of a camera satisfying these prerequisites will be described below.

FIG. 15 is a front view of a camera of a related art in which components are laid out to meet the above prerequisites.

In the first related art, as shown in FIG. 15, a cartridge chamber PT is located in the right-hand area (left in FIG. 15) of a camera housing and a spool chamber SP is located in the left-hand area of the camera housing. A lens barrel L is located between the cartridge chamber PT and spool chamber SP. A battery storage BT is located on the left-hand side of the spool SP. A strobe ST is located above the battery storage BT. In this layout, a distance d4 between the lens and strobe ST is long enough. RS, AF, F, and W in FIG. 15 respectively denote a release button, an auto-focus unit, a viewfinder unit, and a film wind/rewind gear array. Alphanumeric characters h4 and r4 denote a height of the camera housing and a distance between an optical axis and a right-hand side surface of the camera housing (side surface of a gripping section) respectively.

In the foregoing layout of the first related art, the distance r4 between the optical axis and right-hand side surface of the camera housing is so short that when a user holds the camera, the fingers of the right hand gripping the camera are likely to intrude into the front of the lens to intercept part of a beam. Moreover, since the user's thumb interferes with a projection of the lens barrel, the camera is hard to grip.

FIG. 16 is a front view of a camera of the second related art in which components are laid out to meet the foregoing prerequisites.

In the camera of the second related art, a battery storage BT is located on the right-hand area (left in FIG. 16) of a camera housing. This is a difference from the camera of the first related art. According to this layout, a distance d5 between a strobe ST and a lens barrel L becomes shorter than a distance d4 in the first related art. In the second related art, when the camera is put to practical use, the strobe ST is popped up in the arrow direction to provide a long distance d'5. Z denotes a zoom drive. Alphanumeric characters h5 and r5 denote a height of the camera housing and a distance from an optical axis to the right-hand side surface of the camera housing (side surface of a gripping section) similar to those in the first related art.

In the foregoing layout of the second related art, the distance r5 between the optical axis and the right-hand side surface of the camera housing is larger than the distance r4 in the first related art. Occurrence of the aforesaid drawbacks is diminished. However, since the strobe ST must be popped up as described above to avoid occurrence of a red-eye phenomenon resulting from a decrease in the distance d5 between the optical axis and the strobe, this related art is disadvantageous in terms of cost and space.

When a strobe and a gripping section of a camera housing are arranged with a lens barrel between as described above, the strobe occupies a large portion of the space of the camera housing. This is disadvantageous, in particular, to a compact camera which has been demanded to be more and more compact.

FIG. 17 is a front view of a third related art showing a single-lens reflex camera having a layout that meets the foregoing prerequisites.

The layout of the camera of the third related art greatly differs from the first and second related arts in a point that a strobe ST is located in the right-hand area (left in FIG. 17) of a camera housing: that is, on a gripping section of the camera housing. The appearance of the camera is shown in FIG. 18. A strobe 32 (aforesaid strobe ST) of a camera 31 is of a pop-up type. A release button 34 (release button RS) is located below the strobe 32 on the front of a camera housing 33 in a bid to prevent a finger from intruding into the strobe 32. As a result, a finger of a user's right hand for manipulating release comes to lie on the front of the camera housing 33 in a natural manner. This prevents a finger from intruding into the strobe 32 located above the release button 34.

The above layout has succeeded in increasing a distance d6 between a lens and a strobe ST. The strobe ST is designed, similarly to that in the second related art, to pop up in the arrow direction. Therefore, the distance d6 becomes further longer. MD and AD denote a mirror aperture drive unit and an auto-focus lens drive unit respectively. Alphanumeric characters h6 and r6 denote a distance from a release button RS to a bottom of a camera housing and a distance from an optical axis to a right-hand side surface of a camera housing (side surface of a gripping section) respectively.

In the foregoing layout of the third related art, the distance r6 between the optical axis and the right-hand side surface of the camera housing is relatively long. The aforesaid problems have thus been solved. However, since the strobe ST is located in the right-hand area of the camera, when a release button is located on the top of the camera, a beam traveling from the strobe ST may be intercepted by a finger. In an attempt to cope with this problem in this related art, a release button RS is arranged in the right-hand area of the front of the camera. However, in this layout, the index to little fingers of the right hand gripping the camera housing stays in an area equivalent to a distance h6 from the release button RS to the bottom of the camera housing. When the distance h6 is held equal to the distance h4 of the first related art, a space allocated to each of the fingers shrinks to disable stable gripping. When the distance h6 is increased in an attempt to improve gripability, the camera housing cannot help being made larger.

One of the prerequisites for a camera is to solve a problem that a photographer intercepts a strobe beam with his/her finger.

FIGS. 19 and 20 are front views of a general camera in which the above problem is solved, thus showing a fourth related art.

In the camera of the fourth related art, a release button 42 is located on the right-hand area (left in FIGS. 19 and 20) of the top of a camera housing 40, and a strobe 44 is located on the left-hand (right in FIGS. 19 and 20) upper area of the front of tile camera housing 40. Below the strobe 44, a projection 46 is formed on the front of the camera housing 40 to prevent a finger from intruding into the strobe 44. Specifically, when a user senses the projection 46 with the left hand, the user refrains from extending his/her finger beyond the projection 46. Thus, the projection 46 prevents a finger from intruding into the strobe 44.

In the foregoing fourth related art, similarly to a majority of general cameras on the market, the release button 42 is located on the right-hand area of and the top of the camera housing 40. Therefore, the positions of the fingers of the right hand are specified in a natural manner; that is, the index finger rests on the release button 42, the middle, ring, and little fingers stay on the front of the camera housing 40, and the thumb rests on the back of the camera housing 40. On the other hand, the positions of the fingers of the left hand are hardly specified. This is because the left hand does not take part in release manipulation but plays mere a supplementary role in holding a camera housing. Besides, a way of gripping a camera with the left hand varies from user to user. In particular, when taking photographs, a user is usually not conscious of the presence of the projection 46. As shown in FIG. 20, therefore, a finger of the left hand may screen the strobe 44 without sensing the projection 46. In this case, the user is unaware that his/her finger has intruded into the strobe 44, and takes a photograph.

OBJECTS AND SUMMARY OF THE INVENTION

A first object of the present invention is to provide a camera that makes it possible to grip a camera housing with ease and reduce occurrence of a red-eye phenomenon without employing a complex mechanism and increasing the size or the camera housing.

A second object of the present invention is to provide a camera capable of improving the freedom of the user's left hand during photography, preventing a finger from screening a strobe unexpectedly during photography, and being designed compactly.

A third object of the present invention is to provide a camera capable of informing a user of a non-photographic state reliably and preventing incorrect manipulation of release in the non-photographic state.

A fourth object of the present invention is to provide a camera capable of ensuring stable gripping, alleviating a hand tremor, and reducing a load a user incurs in gripping a camera housing.

A fifth object of the present invention is to provide a camera capable of suppressing a reduction in a quantity of strobe light due to circulation of a lead wire, and simplifying product and quality control in physical distribution.

A sixth object of the present invention is to provide a camera permitting excellent operability and having a main switch that accentuates the design of the camera.

Briefly, a camera according to the present invention comprises a camera housing, an optical system located substantially in the center of the camera housing, a gripping section formed at an end of the camera housing, a release member installed above the gripping section and on the top of the camera housing, a strobe which is arranged on the front of the camera between the release member and the gripping section in such a manner that when the camera housing is gripped by a human hand, the strobe will come between a finger for manipulating release and the other fingers for gripping the gripping section, and a finger intrusion prevention member that has a convex portion for preventing any of the fingers for gripping the gripping section from intruding into the strobe. This alleviates a red-eye phenomenon, and prevents vignetting of strobe light by any of the fingers for gripping the camera.

The above objects and advantages of the present invention will be apparent from the detailed explanation given below.

DETAILED DESCRIPTION OF THE PREFERRED EMBODIMENTS

Figure 1:
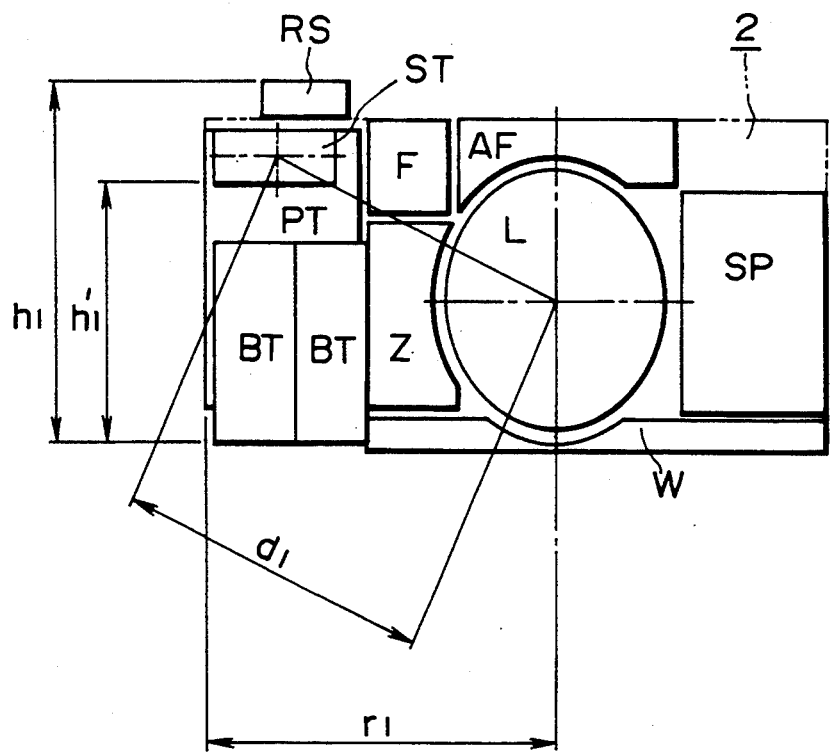
FIG. 1 is a front view showing a layout of components of a camera of a first embodiment of the present invention.
Figure 2:
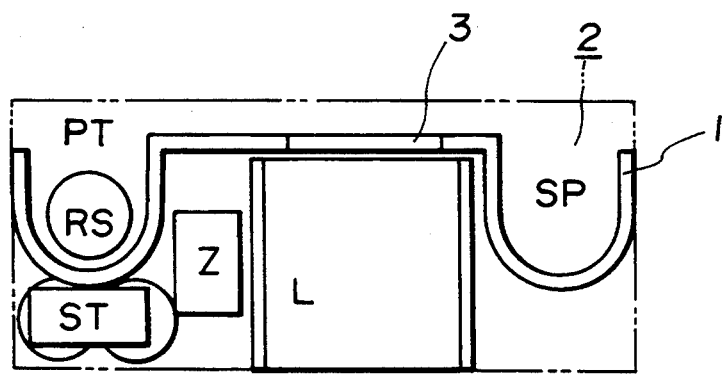
FIG. 2 is a plan view showing a layout of components of the camera of the first embodiment.

FIGS. 1 and 2 show layouts of components of a camera of the first embodiment of the present invention. FIG. 1 is a front view, and FIG. 2 is a plan view.

The camera of the first embodiment consists mainly of a camera housing 2, a cartridge chamber PT formed in the right-hand area (left in FIGS. 1 and 2) of a camera frame 1 in the camera housing 2, a spool chamber SP formed in the left-hand area of the camera frame 1, an aperture 3 (See FIG. 2) formed in the middle of a bridge between the cartridge chamber PT and spool chamber SP, a lens barrel L that is installed in front of the aperture 3 along an optical axis and in which a zoom lens unit is incorporated, a zoom lens drive unit Z that is installed between the lens barrel L and the cartridge chamber PT and transmits driving force to the lens barrel L, a viewfinder F installed above the zoom lens drive unit Z, an auto-focus range finder AF (hereafter, range finder AF) installed above the lens barrel L, a strobe ST installed in the upper front of the cartridge chamber PT, a battery storage BT installed in the lower front of the cartridge PT, a release button RS installed above the strobe ST and on the top of the camera housing 2 covering the camera frame 1, and a film wind-/rewind gear array W installed below the camera frame 1.

Alphanumeric characters h1, h'1, d1, and r1 in FIG. 1 denote a distance between the release button RS and the bottom of the camera housing 2, a distance between the strobe ST and the bottom of the camera housing 2, a distance between the optical axis and the center of the strobe ST, and a distance between the optical axis and the right-hand side surface of the camera housing 2 respectively.

Figure 3:
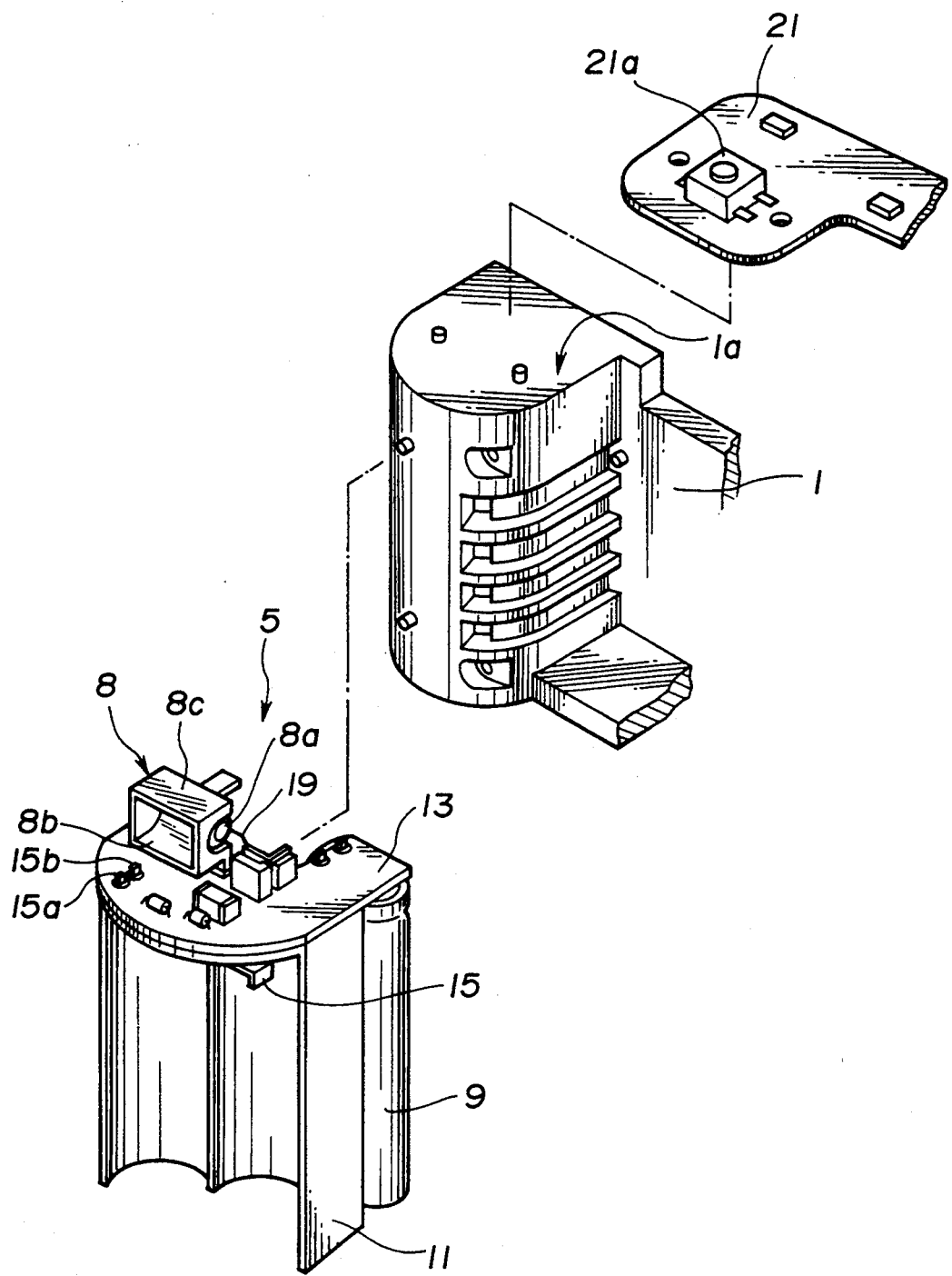
FIG. 3 is an enlarged oblique exploded view showing peripheral components of a strobe in the camera of the first embodiment.

FIG. 3 is an enlarged oblique view showing peripheral components of a strobe ST in the camera of the first embodiment.

As shown in FIG. 3, a strobe unit S consists mainly of a battery storage 11 capable of accommodating two batteries (aforesaid battery storage BT), a strobe substrate 13 placed on the battery storage 11, a strobe main capacitor 9 installed behind the battery storage 11 and connected to the strobe substrate 13 via a terminal formed on the bottom of the strobe substrate 13, a battery contact strip 15 that is formed on the top inner wall of the battery storage 11 and serves as a contact for conducting batteries (not shown) accommodated in the battery storage 11, and a strobe 8 (aforesaid strobe BT) placed on the top of the strobe substrate 13.

The battery contact strip 15 is connected to terminals 15a and 15b at its proximal end and thus attached to the strobe substrate 13. The strobe 8 comprises a xenon flashtube 8a, a reflector 8b, and a support member 8c for supporting these members. The strobe 8 flashes using electricity charged in the strobe main capacitor 9. A lead wire 19 for connecting between the strobe 8 and the strobe main capacitor 9 and various electrical parts are arranged on the strobe substrate 13.

The strobe unit 5 is united with the front of a cartridge chamber (aforesaid cartridge chamber PT) 1a. A main substrate 21 on which a release switch 21a is placed is united with the top of the cartridge chamber 1a.

Figure 4:
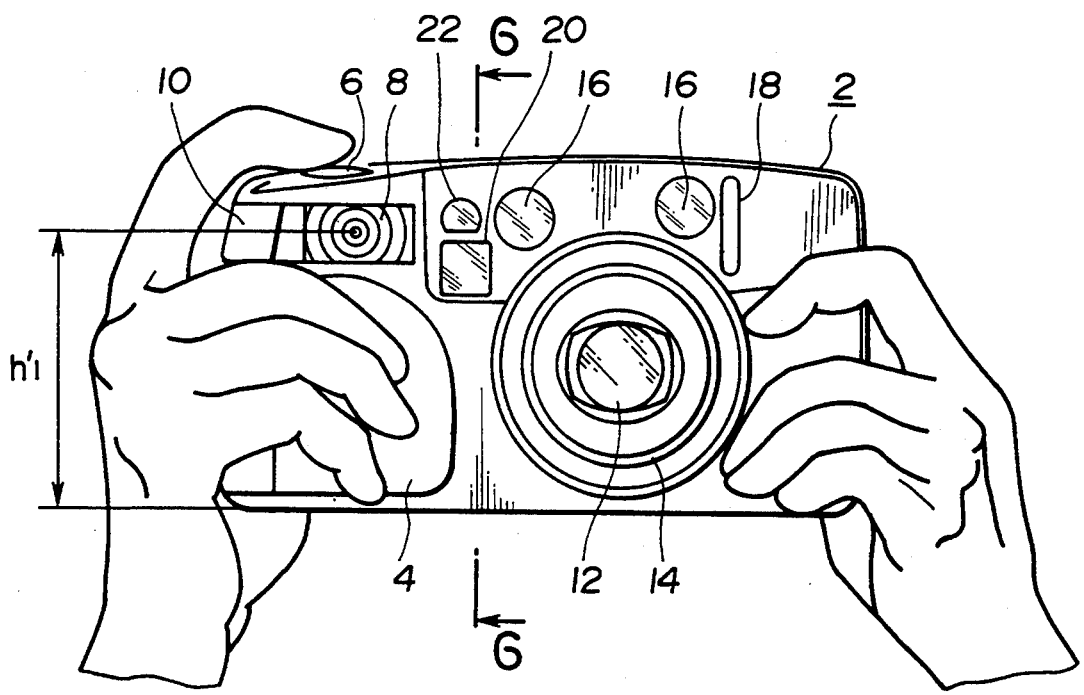
FIG. 4 is a front view showing a state in which a strobe screen member of the camera of the first embodiment lies at an exposure position.
Figure 5:
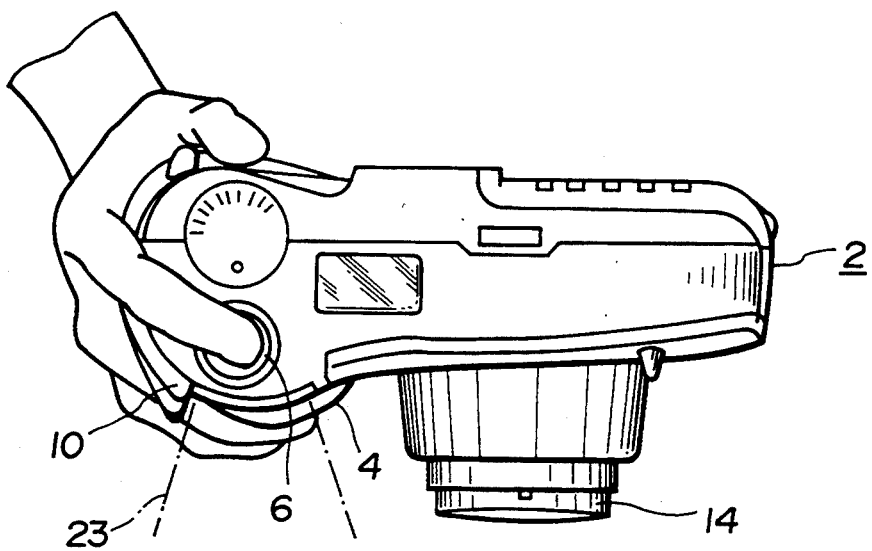
FIG. 5 is a top plan view of the camera shown in FIG. 4.

FIGS. 4 and 5 show the appearance of a camera having the aforesaid construction.

Figure 6:
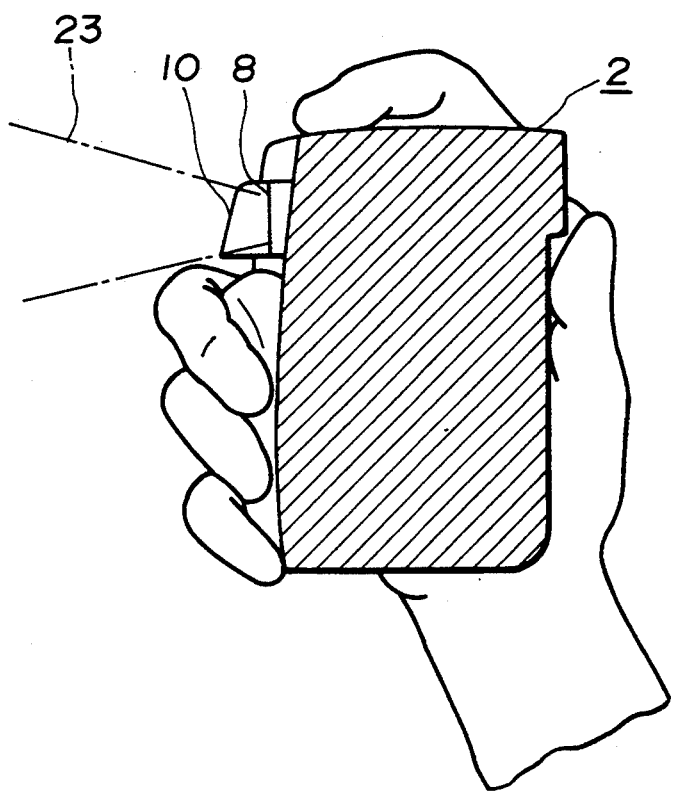
FIG. 6 shows an A—A cross section of the camera shown in FIG. 4.

A grip 4 constituting part of a camera gripping section is formed in the right-hand area of a camera housing 2. The grip 4 is swelling outwardly more than the other portion of the camera housing 2 as shown in FIG. 6, which, therefore, can be gripped easily by a user's right hand easily.

Figure 7:
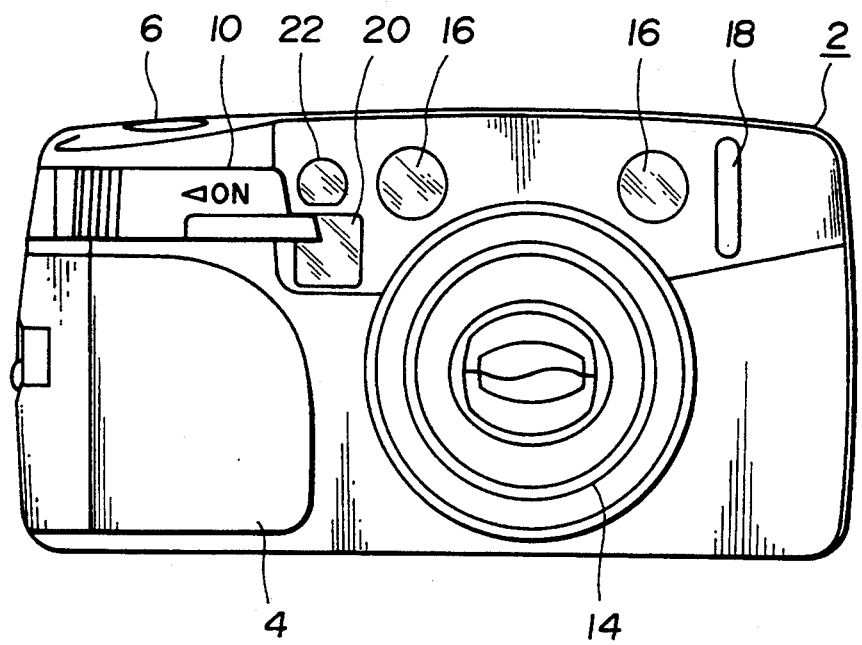
FIG. 7 is a front view showing a state in which the strobe screen member of the camera shown in FIG. 4 lies at a screen position.
Figure 8:
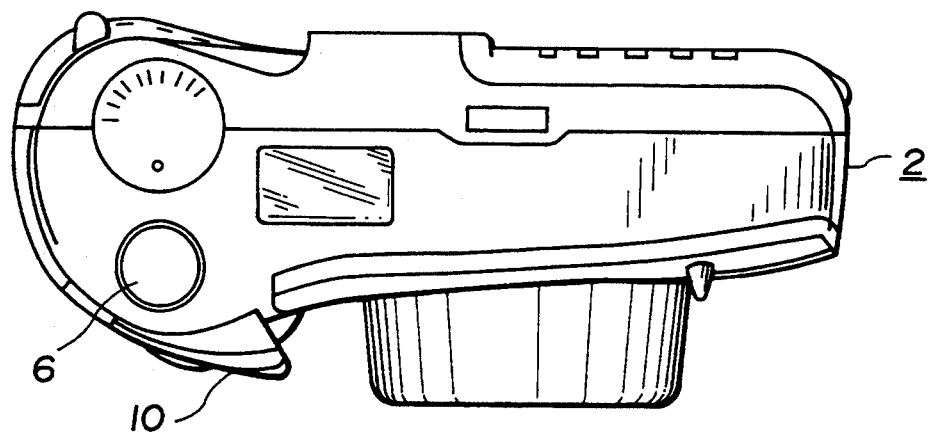
FIG. 8 is a top plan view of the camera shown in FIG. 7.

A release button 6 is located in the right-hand area of the top of the camera housing 2, and a strobe 8 is located in the upper right area on the front of the camera housing 2. A strobe screen member 10 is attached to the camera housing 2 so as to screen the strobe 8. The strobe screen member 10 is movable between an exposure position for exposing the strobe 8 as shown in FIGS. 4 and 6, and a screen position for screening, i.e. covering, the strobe 8 as shown in FIGS. 7 and 8. At the exposure position, a free end of the strobe screen member 10 projects forward and away from camera housing 2.

The strobe screen member 10 is connected to a main switch means, which is not shown, relating to an entire camera. When the strobe screen member is set at the exposure position, the camera is put in a photographic state or turned on. When the strobe screen member is set at the screen position, the camera is put in a non-photographic state or turned off.

When the strobe screen member 10 lies at the screen position, the left-hand end of the strobe screen member 10 projects toward the left-hand side of the strobe 8. Consequently, the strobe screen member 10 screens a viewfinder object window 20 (front of the aforesaid viewfinder F) (See FIG. 7).

In the center of the front of the camera housing 2, a lens barrel 14 (aforesaid lens barrel L) for holding a lens 12 is mounted in such a manner that the lens can stretch, i.e. extend, or contract along the optical axis. A pair of AF windows 16 are formed above the lens barrel 14. On the left-hand side of the lens barrel 14, an LED window 18 is formed as part of the camera housing 2. On the right-hand side of the lens barrel 14, a viewfinder object window 20 is formed on the front of the camera housing 2. A photometry window 22 is located above the viewfinder object window 20.

The operation of a camera of this embodiment having the aforesaid construction will be described.

Figure 9:
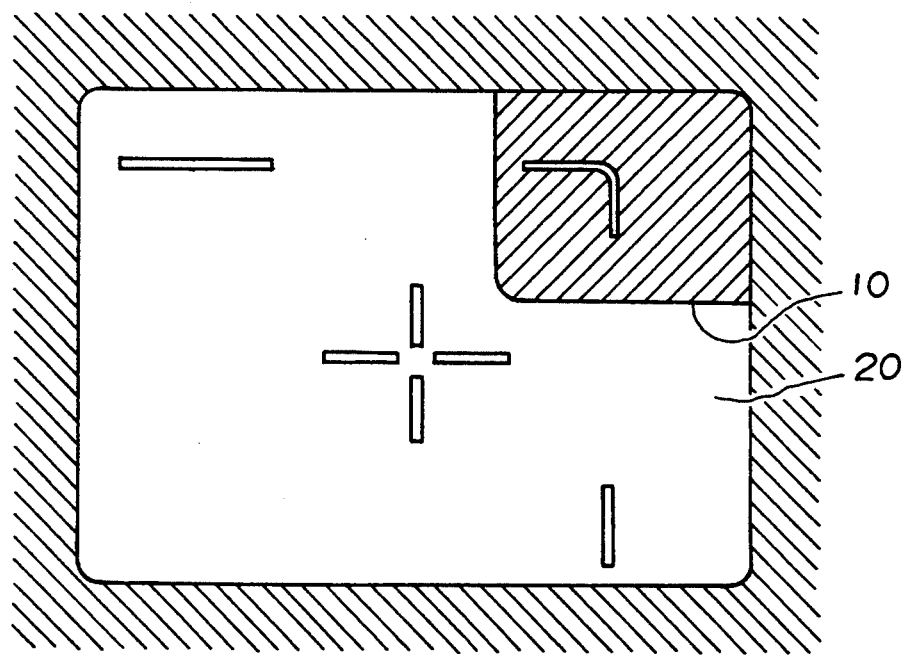
FIG. 9 shows a state in which the strobe screen member of the camera shown in FIG. 7 screens a viewfinder object window.

When a strobe screen member 10 lies at a screen position as shown in FIGS. 7 and 8; that is, a camera is off, if a user looks into a viewfinder object window 20, part of the viewfinder object window 20 is seen, as shown in FIG. 9, screened by the distal end of the strobe screen member 10. Then, the user recognizes at sight that the camera is in a non-photographic state.

While holding a grip 4 with the right hand, the user slides the strobe screen member 10 from the screen position shown in FIGS. 7 and 8 to an exposure position shown in FIGS. 4 and 5 using the index finger of the right hand. This causes a main switch connected to the strobe screen member 10 to turn on the camera. Eventually, release is enabled.

At this time, the strobe screen member 10 has withdrawn from the field of the viewfinder object window 20. The strobe screen member 10 has exposed a strobe 8 and is projecting forward from the camera housing 2.

The fingers of the user's right hand gripping the camera housing 2 are located as described below.

Specifically, as shown in FIG. 4, the index finger is resting on a release button 6, the thumb is lying on the 10 back of the camera housing 2, and the middle to little fingers are staying in an area of a height h'1 (See FIG. 1) from the strobe window 8 to the bottom of the camera housing 2 on the grip 4 located below the strobe 8. The middle finger is in contact with the strobe screen member 10 projecting forward from the camera housing 2 and lying on the grip 4. Thus, the positions of the fingers of the user's right are restricted by the strobe screen member 10 and the grip 4, while the user has no feeling of unnaturalness. Therefore, strobe light 23 will not be vignetted by the middle finger.

As for a user's left hand, a user can hold the fingers in any manner unless the user grips a camera in an especially abnormal fashion. Alternatively, a user need not use the left hand and may use the right hand alone to grip a camera.

The distance h'1 mentioned above is shorter than the distance h4 or h5 in the first or second related art. This results from the presence of the strobe window 8. At sight, the camera appears poor in grip-ability. However, the camera of this embodiment successfully prevents a user's finger from screening the strobe window 8 while offering excellent camera grip-ability. This is attributable to such an adroit layout that when a user grips the camera housing 2 as shown in FIGS. 4 and 6, the user's three fingers of middle to little fingers stay at specific positions and the strobe window 8 comes between these fingers and the index finger for manipulating release.

In this embodiment, a distance r1 between the optical axis and the right-hand side surface of the camera housing 2 (See FIG. 1) is long enough to improve transverse grip-ability. A distance d1 between the strobe ST and optical axis (See FIG. 1) is long enough, helping diminish occurrence of a red-eye phenomenon without using a complex mechanism.

On the other hand, a strobe 8 (See FIG. 3), a strobe substrate 13 (See FIG. 3), and a battery storage 11 (See FIG. 3) are integrated to form a unit. This minimizes a reduction in a quantity of strobe light due to circulation of a lead wire 19 (See FIG. 3), and simplifies product and quality control in physical distribution.

Since batteries whose weight occupies a large percentage of an overall weight of a camera are placed in the right-hand area of a camera housing, the camera has a center of gravity in the right-hand area. Therefore, when the camera housing is gripped, a smaller moment of inertia is applied to the right hand. Thus, stable gripping is ensured and a hand tremor is alleviated. A load a user incurs in holding the camera housing by grip 4 is diminished.

Moreover, finger intrusion to the strobe is reliably prevented without increasing the size of the camera or giving a user an unnatural feeling, while excellent grip-ability is provided. Furthermore, the strobe screen member 10 has a capacity for preventing finger intrusion and a capability of a main switch with excellent operability, and accentuates the design of the camera.

When photography is not performed, an indication appears in a viewfinder because of the strobe screen member. This informs a user of a non-photographic state, and, eventually, prevents the user from manipulating release in the non-photographic state.

Figure 10:
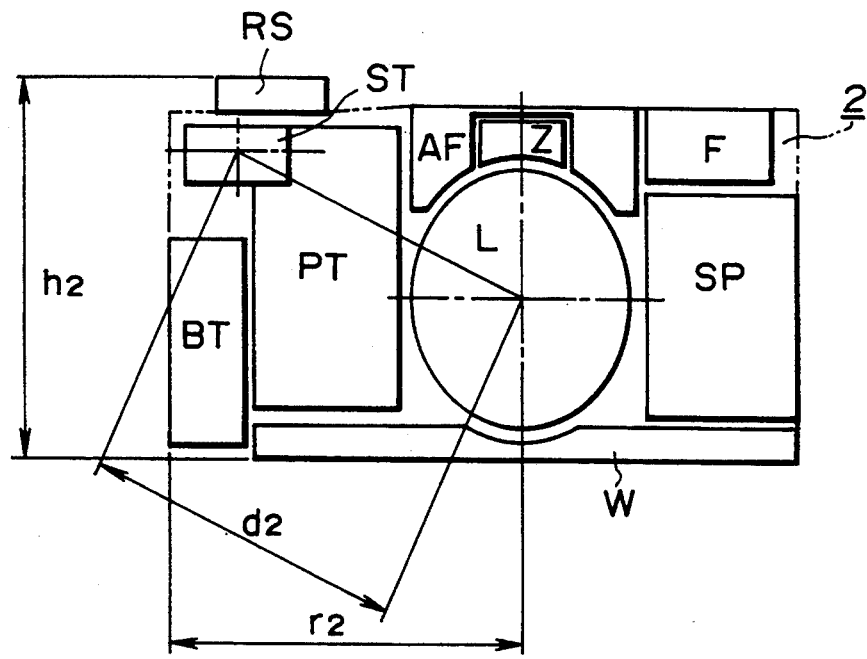
FIG. 10 is a front view showing a layout of components of a camera of a second embodiment of the present invention.

FIG. 10 is a front view showing a layout of components of a camera of the second embodiment of the present invention.

The camera of the second embodiment consists mainly of a camera housing 2, a cartridge chamber PT formed in the right-hand area of a camera frame (not shown) similar to that in the first embodiment, a spool chamber SP formed in the left-hand area of the camera frame, an aperture (not shown) formed in the middle of a bridge between the cartridge chamber PT and the spool chamber SP, a lens barrel that is installed in front of the aperture and in which a zoom lens unit is incorporated, a zoom lens drive unit Z that is installed above the lens barrel L and transmits a driving force to the lens barrel L, a range finder AF installed above the zoom lens drive unit Z, a viewfinder F installed above the spool chamber SP, a strobe ST installed in the upper front the cartridge chamber P and near the right-hand side surface of the camera housing 2, a battery storage BT formed near the right-hand side surface of the camera housing, a release button RS installed above the strobe ST and on the top of the camera housing 2, and a film wind/rewind gear array W installed below the camera frame.

Alphanumeric characters h2, d2, and r2 in FIG. 10 denote a distance between the release button RS and the bottom of the camera housing 2, a distance between the optical axis and the strobe unit ST, and a distance between the optical axis and the right-hand side surface of the camera housing 2.

A mode of gripping this embodiment having the aforesaid construction is identical to that of the first embodiment. This embodiment has the same advantages as the first embodiment. Specifically, the distance r2 between the optical axis and the right-hand side surface of the camera housing 2 is long enough to improve transverse grip-ability. Moreover, the distance d2 between the strobe unit ST and the optical axis is long enough to diminish occurrence of a red-eye phenomenon without using a complex mechanism. Furthermore, since batteries whose weight occupies a large percentage of an overall weight of the camera are placed in the right-hand area of the camera housing, the camera has a center of gravity which lies in the right-hand area of the camera housing. Therefore, when the right-hand area of the camera housing is gripped, a reduced moment of inertia is applied to the right hand. Thus, stable gripping is ensured and a hand tremor is alleviated. A load a user incurs in holding the camera housing is diminished.

Figure 11:
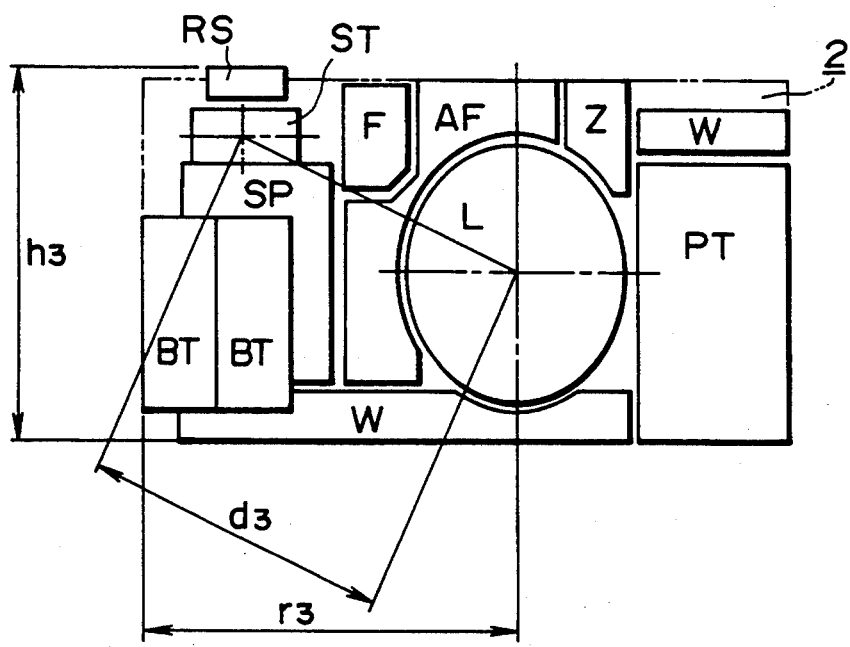
FIG. 11 is a front view showing a layout of components of a camera of a third embodiment of the present invention.

FIG. 11 is a front view showing a layout of components of a camera of the third embodiment of the present invention.

A great difference of the third embodiment from the aforesaid first and second embodiments is that the locations of a cartridge chamber PT and a spool chamber SP in a camera frame are reversed.

As shown in FIG. 11, the camera of the third embodiment consists mainly of a camera housing 2, a cartridge chamber PT formed in the left-hand area of a camera frame (not shown) similar to that of the first or second embodiment, a spool chamber SP formed in the right-hand area of the camera frame, an aperture (not shown) formed in the middle of a bridge between the cartridge chamber PT and the spool chamber SP, a lens barrel L that is installed in front of the aperture and in which a zoom lens unit is incorporated, a zoom lens drive unit Z that is installed on the upper left-hand side of the lens barrel L and transmits driving force to the lens barrel L, a range finder AF extending from above to the right-hand side of the lens barrel L, a viewfinder F installed on the upper right-hand side of the range finder AF, a strobe ST installed above the spool chamber SP, a battery storage BT formed on the front right-hand side of the spool chamber SP and near the right-hand side surface of the camera housing, a release button RS installed above the strobe unit ST and on the top of the camera housing 2, and a film wind/rewind gear array W part of which is installed below the camera frame and the other part of which is installed above the cartridge chamber PT.

Alphanumeric characters h3, d3, and r3 in FIG. 11 denote a distance between the release button RS and the bottom of the camera housing 2, a distance between the optical axis and the strobe ST, and a distance between the optical axis and the right-hand side surface of the camera housing 2 respectively.

A mode of gripping this embodiment constructed as mentioned above is identical to that of the first or second embodiment. This embodiment has the same advantages as the first or second embodiment. Specifically, the distance r3 between the optical axis and the right-hand side surface of the camera housing 2 is long enough to improve transverse grip-ability. Moreover, the distance d3 between the strobe ST and the optical axis is long enough to diminish occurrence of a red-eye phenomenon without using a complex mechanism. Furthermore, since batteries whose weight occupies a large percentage of an overall weight of a camera are placed in the right-hand area of the camera housing, the camera has a center or gravity in the right-hand area of the camera housing. Therefore, when gripping the camera housing, a user feels a smaller moment of inertia in the right hand. Thus, stable gripping is ensured and a hand tremor is alleviated. Consequently, a load a user incurs in holding the camera housing is diminished.

Figure 12:
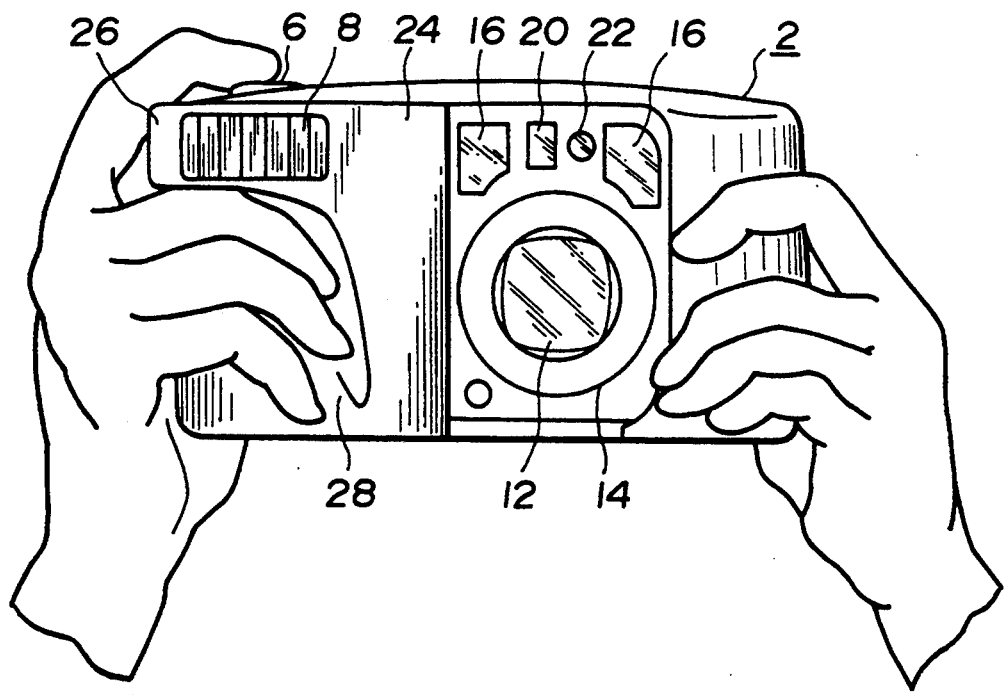
FIG. 12 is a front view of a camera of a fourth embodiment of the present invention.
Figure 13:
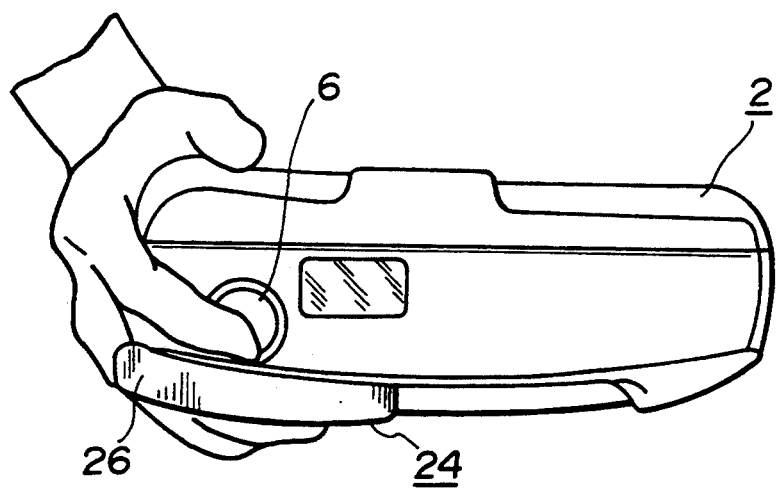
FIG. 13 is a top plan view of the camera shown in FIG. 12.
Figure 14:
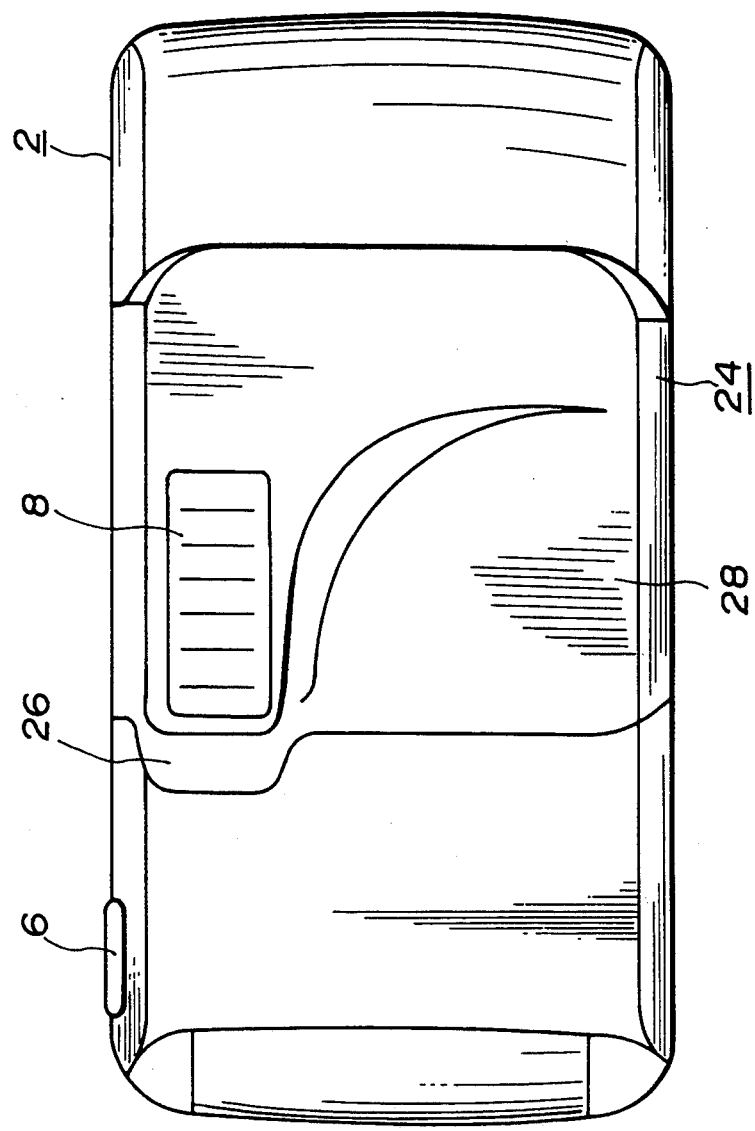
FIG. 14 is a front view showing a state in which a lens screen member of the camera shown in FIG. 12 lies at a screen position.
Figure 15:
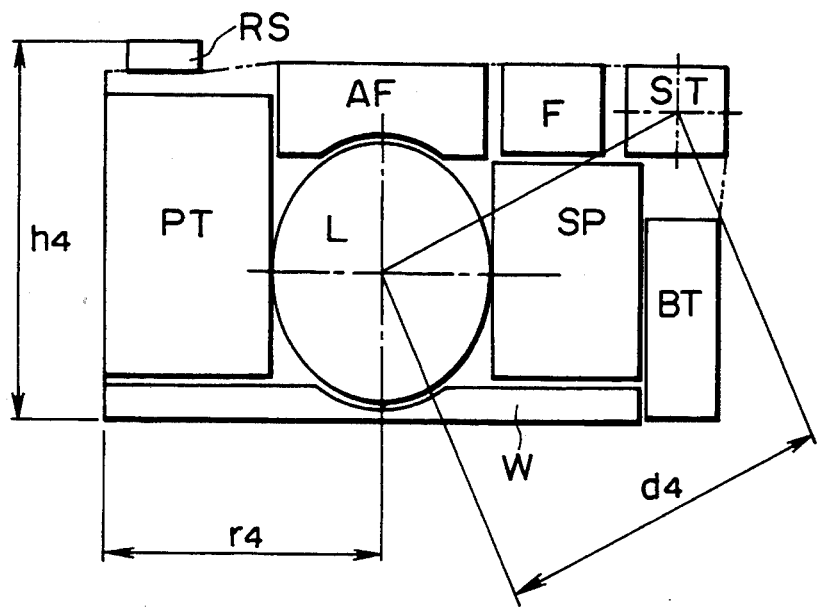
FIG. 15 is a front view showing a layout of components of a camera of the first related art.
Figure 16:
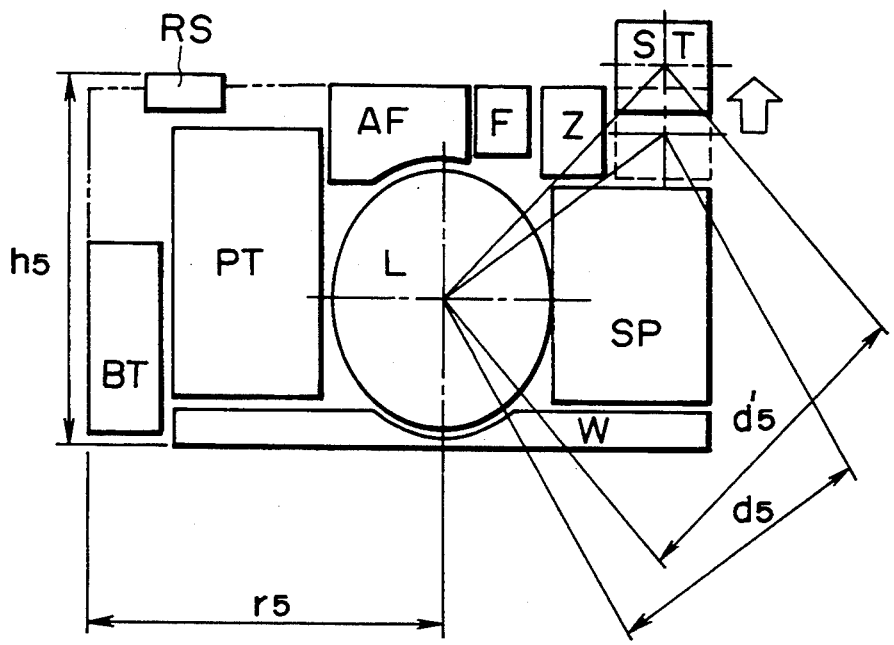
FIG. 16 is a front view showing a layout of components of a camera of the second related art.
Figure 17:
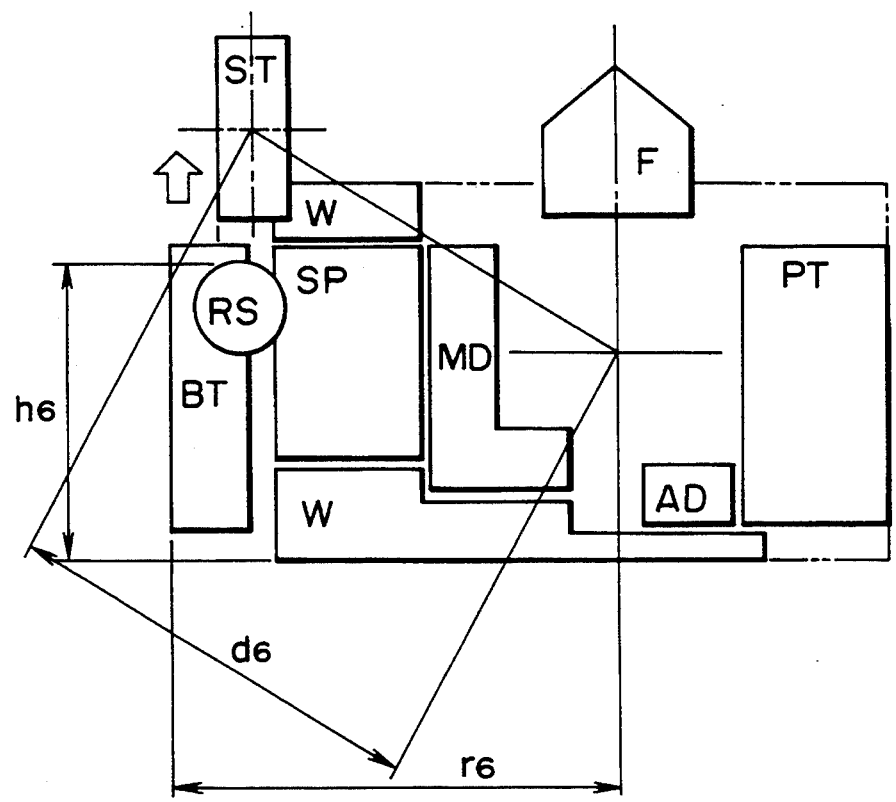
FIG. 17 is a front view showing a layout of components of a camera of the third related art.
Figure 18:
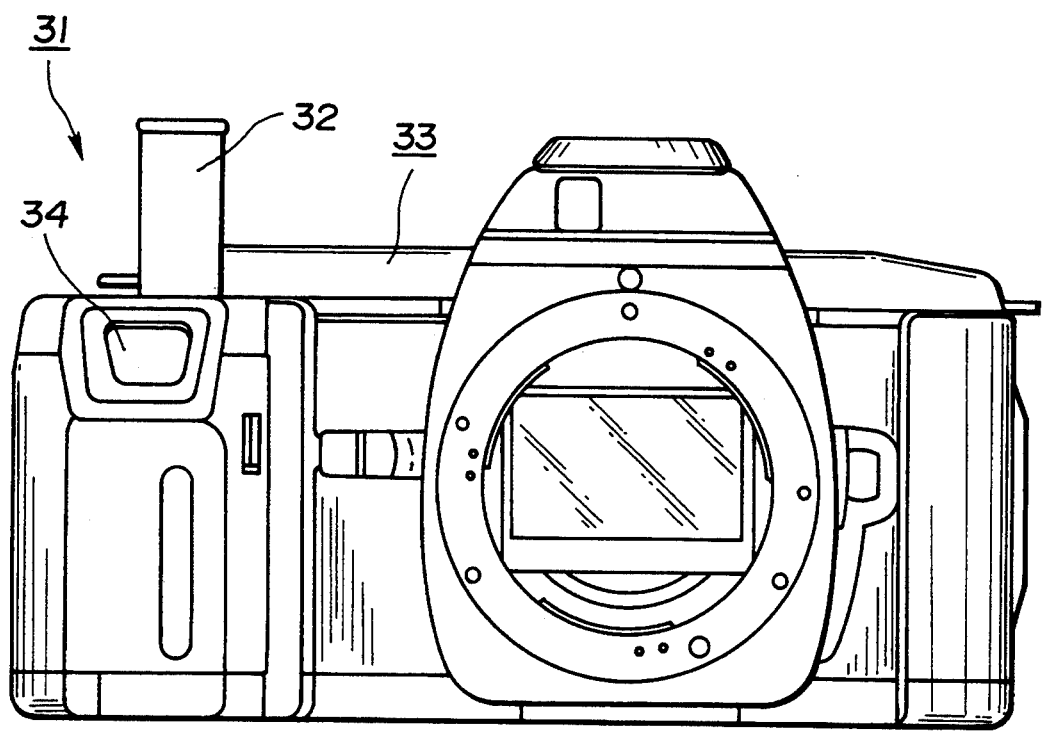
FIG. 18 is a front view of the camera shown in FIG. 17.
Figure 19:
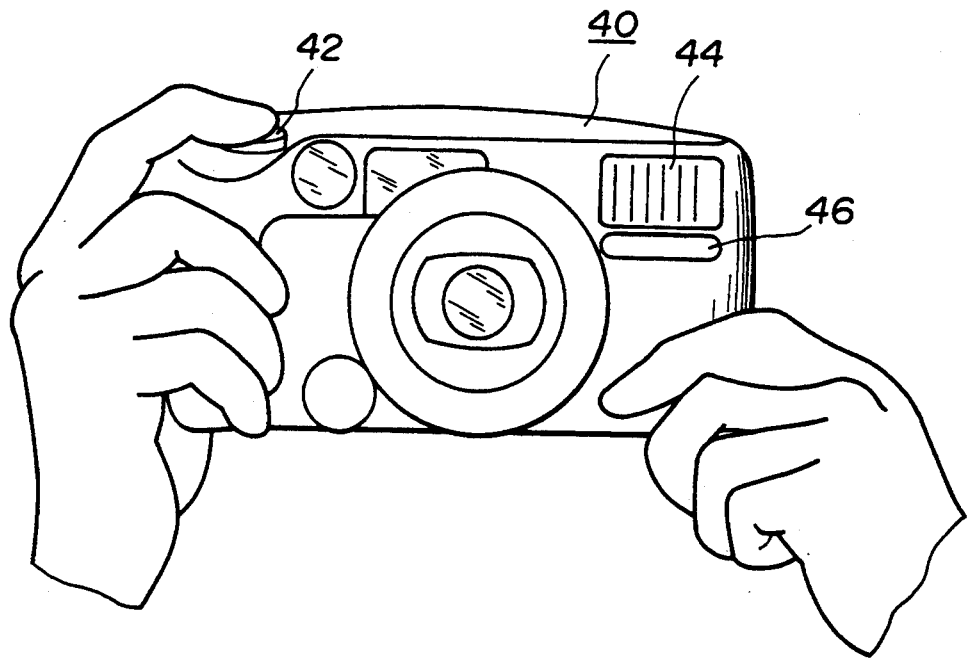
FIG. 19 is a front view showing a state in which a camera of the fourth related art is correctly held by a user.
Figure 20:
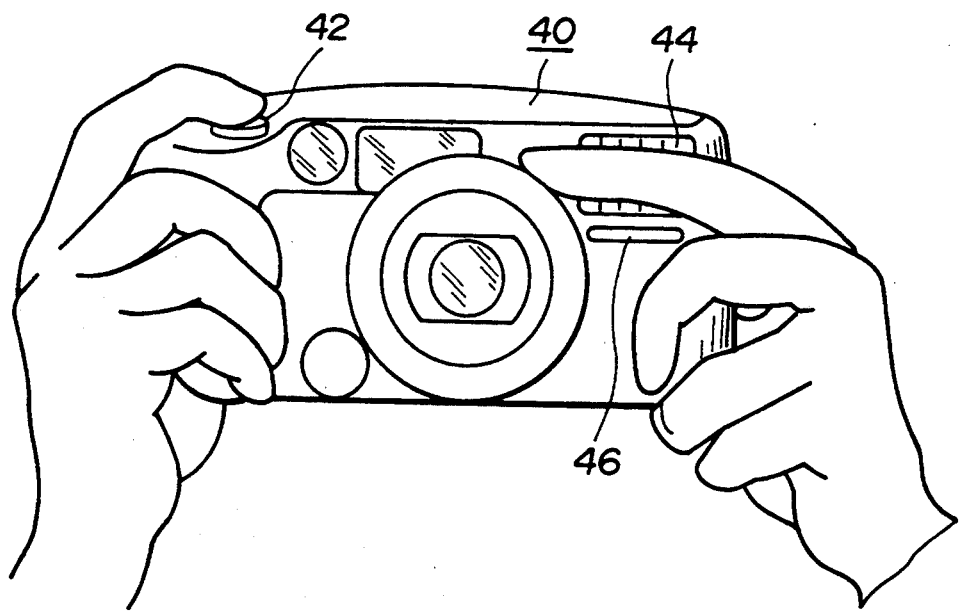
FIG. 20 is a front view showing a state in which the camera shown in FIG. 19 is incorrectly held by a user.

FIGS. 12 to 14 show the fourth embodiment of the present invention.

As shown in FIGS. 12 to 14, a release button 6 is located In the right-hand area (left in FIGS. 12 to 14) of the top of a camera housing 2. A lens barrel 14 is installed in the center of the front of the camera housing 2 in such a manner that the lens barrel 14 can advance or withdraw along the optical axis of a lens. An AF window 16, a photometry window 22, and a viewfinder object window 20 are formed as part of the camera housing 2 above the lens barrel 14 on the front of the camera housing 2.

A lens screen member 24 capable of screening all of the lens barrel 14, AF window 16, photometry window 22, and viewfinder object window 20 is installed on the front of the camera housing 2. The lens screen member 24 is supported by the camera housing 2 to be movable between an exposure position for exposing the above members as shown in FIGS. 12 and 13 and a screen position for screening the above members as shown in FIG. 14.

A strobe unit 8 is formed in the upper right-hand area of the front of the lens screen member 24. A projection 26 is formed as part of the front of the lens screen member 24 to fence the outer circumference of the strobe unit 8.

Half of the right-hand portion of the front of the lens screen member 24 serves as a grip 28 having a concave portion that enables a user to easily have a firm grip of the camera.

The lens screen member 24 has a capability of a main switch relating to an entire camera. When the lens screen member 24 is set at the exposure position, the camera is put in a photographic state or turned on. When the lens screen member 24 is set at the screen position, the camera is put in a non-photographic state or turned off.

The other components are almost identical to those of the first embodiment.

The operation of the camera of the fourth embodiment constructed as mentioned above will be described.

As shown in FIG. 14, when a lens screen member 24 lies at a screen position; that is, a camera is off, if a user looks into a viewfinder object window 20, the viewfinder object window 20 is seen completely screened by the lens screen member 24. Instantaneously, the user recognizes that the camera is in a non-photographic state.

When the user slides the lens screen member 24 to an exposure position shown in FIGS. 12 and 13 while gripping the camera with the right hand, the camera is turned on to enter a photography standby state. At this time, the field of the viewfinder object window 20 is not vignetted by the lens screen member 24. The fingers of the user's right hand gripping the camera are ready for photography and located as follows; the index finger rests on a release button 6, the thumb lies on the back of a camera housing 2, and the middle to little fingers stay below a strobe 8 on a grip 28 of the lens screen member 24. A projection 26 formed along the outer circumference of the strobe on the lens screen member 24 successfully restricts intrusion of the middle finger of the user's right hand, thus preventing the finger from intercepting strobe light.

As described so far, the fourth embodiment provides a camera that is capable of being designed compactly if necessary, successfully preventing a user's finger from intercepting strobe light, and providing excellent grip-ability, and that includes a lens screen member which has a capacity for preventing a user's finger from intercepting strobe light, a capability of a main switch, and a capacity for displaying an on or off state of the camera and that In the present invention, it will be apparent that a wide range of different working modes can be formed on the basis of this invention without departing from the spirit and scope of the invention. This invention will not be restricted to any specific embodiment but be limited to the appended claims.

What is claimed is:

1. A camera with a built-in strobe, comprising:
    a camera housing;
    an optical system installed in said camera housing;
    a gripping section formed at an end of said camera housing;
    a strobe installed on a front of the camera in one end of said gripping section;
    a release member installed above said strobe and on a top of said camera housing; and
    said gripping section of said camera housing being laid out in such a manner that one of a cartridge chamber and a spool chamber is located in a back portion of said camera housing, battery storage means is located in front of one of said cartridge chamber and said spool chamber, a strobe substrate is located on said battery storage means, a capacitor is located under said strobe substrate with a terminal attached thereto, and said strobe is located on said strobe substrate.

2. A camera with a built-in strobe according to claim 1, wherein at least one of battery means, a photometer, a zoom drive, and a viewfinder is located in said gripping section of said camera housing.

3. A camera with a built-in strobe according to claim 1, wherein a main substrate having said release member is installed above one of said cartridge chamber and said spool chamber.

4. A camera with a built-in strobe according to claim 1, wherein said battery storage, said strobe substrate, said capacitor, and said strobe are united.

5. A camera with a built-in strobe according to claim 1 wherein said gripping section extends in a direction that does not cross the optical axis of said optical system and in a substantially vertical direction of the camera which is substantially perpendicular to an optical axis of said optical system.

6. A camera having a built-in strobe, comprising:
a camera housing having front and rear faces, said front and rear faces terminating in left and right-hand ends and top and bottom ends;
a photographing optical system installed in said camera housing and extending partially forwardly from said front face, said photographing optical system being intermediate said left and right-hand ends;
a gripping section which deviates from a flat surface of said camera housing being provided at the right-hand end of said camera and occupying a portion of said right-hand end and a portion of the front face between said right-hand end and said photographing optical system, the gripping section having a length measured in the direction extending from said bottom end toward said top end of said camera which is less than a distance between said top and said bottom ends of said camera, said length being sufficient to enable an operator to grip the gripping section with just one hand and thereby stably hold said camera during a photographing operation;
a strobe light emitting section fixedly mounted within said housing and arranged between an upper end of said gripping section and the top end of said camera and being directly above said gripping section so as to be aligned with said gripping section along a line substantially parallel to said right-hand end; and
a release operating member provided on the top end of said camera housing above said strobe light emitting section to enable an operator to comfortably position one finger of a hand holding said gripping section to permit easy operation of said release operating member for initiating a photographing operation.

7. A camera with a built-in strobe according to claim 6, wherein said gripping section extends in a direction that does not cross the optical axis of said optical system and in a substantially vertical direction of the camera which is substantially perpendicular to an optical axis of said optical system.

8. A camera with a built-in strobe according to claim 6, wherein said strobe is a unit comprising at least a battery storage means and a strobe circuit.

9. A camera with a built-in strobe according to claim 6, further comprising a projecting member projecting away from said camera to engage at least one of the fingers of an operator's hand used to grip the camera to aid in preventing any fingers gripping said gripping section from intruding into said strobe.

10. A camera with a built-in strobe according to claim 9, wherein said projecting member is movable between a first position which covers said strobe when the camera is not in use, and a second position which exposes said strobe and aids in preventing any of the fingers gripping said camera gripping section from engaging a small gripping surface of said camera and intruding into said strobe when the camera is in use.

11. A camera with a built-in strobe according to claim 10, wherein said projecting member incorporates a main switch for the camera; and the main switch is turned off when said projecting member is in said first position, and is turned on when said projecting member is in said second position.

12. A camera with a built-in strobe according to claim 10 or 11, wherein said finger rest member has a portion that overlies at least a portion of and is viewable when looking through a viewfinder when said finger projecting member is in said second position and that is displaced from and not viewable through the viewfinder when said projecting member is in said second position.

13. The camera of claim 10 wherein said projecting member is movable between a position covering said strobe and a second position which exposes said strobe and said projecting member aiding in preventing an operator's finger from covering said strobe when said projecting member is in said second position.

14. A camera having a built-in strobe according to claim 6 wherein the camera housing has a thickness measured between said front and rear faces which gradually increases from said left-hand end toward said right-hand end, the increased thickness of said camera extending to said gripping section to facilitate gripping of the camera.

15. A camera having a built-in strobe according to claim 6 wherein a thickness of the camera body measured in a direction between said front and rear faces is greater at said right-hand end than at said left-hand end to provide a gripping section of increased thickness as compared with said left-hand end to facilitate firm gripping of the camera.

16. A camera having a built-in strobe according to claim 15 wherein said gripping section bulges outwardly and away from both said front and rear surfaces at the right-hand end of said camera forming a substantially smoothly curved convex contour for engagement by a hand gripping said gripping section.

17. A camera having a built-in strobe according to claim 6 wherein said right-hand end of said camera receives and concentrates selected components of said camera to provide a camera body whose center of gravity is located in the right-hand end of said camera and between said right-hand end and said optical axis.

18. A camera having a built-in strobe according to claim 17 wherein said components include portable batteries, a main capacitor for said strobe light emitting section and one of a chamber for receiving a film cartridge and a chamber for receiving a take-up spool.

19. A camera having a built-in strobe according to claim 6 wherein the size of said strobe light emitting section is less than a separation distance between a finger resting on the release member and a next adjacent finger of the gripping hand resting on said gripping section so that light emitted from the strobe light emitting section is not interrupted by said fingers.

20. A camera having a built-in strobe according to claim 6 wherein said strobe light emitting section is spaced a distance from an optical axis of said photographing optical system which is sufficient to prevent occurrence of a red eye phenomenon while retaining a compact camera housing.

21. A camera having a built-in strobe according to claim 6, wherein said gripping section has a substantially smooth curved contour for engaging at least two fingers of a hand gripping said gripping section and including a projecting member arranged between said gripping section and the top of said camera and having a pointed projection which displaces a finger resting on the pointed projection from said smoothly curved contour of said gripping section which aids in preventing fingers of the hand holding said gripping section from covering said strobe.

22. A camera with a built-in strobe, comprising:
a patrone chamber formed at a lateral portion of a camera body, said chamber extending in a direction substantially parallel to an adjacent end of said camera body;
a spool chamber formed at another lateral portion of said camera body which is opposite said patrone chamber and adjacent another end of said camera body and which is aligned substantially parallel to said patrone chamber;
strobe means located on a front surface of said camera body adjacent to one of said patrone chamber and said spool chamber whereby said strobe means has a light emitting section located on the front face of said camera body adjacent one of said lateral portions and immediately below said top end; and
a release member arranged on a top end of said camera immediately above said light emitting section and one of said spool chamber and said patrone chamber, said release member being movable to initiate a photographing operation.

23. A camera with a built-in strobe according to claim 22, wherein said strobe means includes battery storage means positioned below said light emitting section.

24. A camera with a built-in strobe according to claim 22, wherein said release member is located above said strobe and on said top end.

25. A camera with a built-in strobe according to claim 22 including a projecting member having a pointed end portion projecting away from said camera body and on a side of said gripping section during the photographing operation to displace a finger of a hand used to hold said gripping section away from a smooth resting place of said gripping section to aid in preventing such finger from overlying said light emitting section.

26. A camera having a built-in strobe according to claim 25 wherein said projecting member is movable between a position covering said strobe light emitting section and a position exposing said strobe light emitting section whereby, when said projecting means is moved to the position exposing said light emitting section, said pointed end portion projects away from said camera housing causing a finger engaging said pointed projection to be displaced from said smooth resting portion of said gripping section to aid in preventing such finger from overlying said light emitting section.

27. A camera having a built-in strobe according to claim 26 further comprising:
a main switch for said camera and responsive to said projecting member and being in an off condition when said projecting member covers said light emitting section and being in an on condition when said projecting member exposes said light emitting section.

28. A camera having a built-in strobe according to claim 26 or claim 27 wherein said projecting member has a portion thereof which overlies at least a portion of a finder and is visible when looking through said finder when said projecting member is in the covering position and wherein said projecting portion is displaced from a field of view of said finder when said projecting member is moved to the position exposing said light emitting section.

29. A camera having a built-in strobe according to claim 22 wherein an upper end of said strobe light emitting section and an upper end of said patrone chamber substantially terminate in a common plane adjacent to a top end of said camera body and which are substantially flush with one another.

30. A camera having a built-in strobe, comprising:
a camera housing;
a gripping section deviating from a flat front face of said camera housing provided along one side of the camera housing and a portion of the front face of said housing adjacent said one side to facilitate gripping of the camera;
a strobe light emitting section provided adjacent to an upper portion of said gripping section;
a release operating member provided in a position above an upper portion of said strobe light emitting section, said release operating member being movable to initiate a photographing operation; and
a movable shielding member for covering said strobe light emitting section when in a first position when the camera is not in use and the second position exposing said strobe light emitting section to enable a photographing operation, said shielding member having a projecting section which, when engaged by a finger of a hand used to hold said gripping section, displaces said finger from a finger holding portion of said gripping section to aid in preventing the strobe light emitting section from being covered by said finger.

31. A camera with a built-in strobe according to claim 30, wherein said shielding member is connected to a switching means, and turns off said switching means when covering said strobe light emitting section and photography is not performed, and turns on said switching means when exposing said strobe light emitting section and photography is performed.

32. A camera with a built-in strobe according to claim 31, wherein said switching means is on when said shielding member has moved to a position at which a middle finger lying below said strobe light emitting section can support the camera.

33. A camera with a built-in strobe according to claim 30, further comprising a viewfinder object window located on a front of the camera; wherein when said shielding member is moved to a position for screening said strobe, an end of said shielding member enters a field of said viewfinder object window to help detect a non-photographic state.

34. A camera with a built-in strobe according to claim 30 where said gripping section has a swelled portion that swells beyond a front face of said camera housing whereby the end of the camera housing occupied by said gripping section curves outwardly to form a gripping section whose thickness gradually increases in moving in a direction from a central portion of the camera body toward the end of the camera body having said gripping section.

35. A camera with a built-in strobe according to claim 34 wherein said shielding member, when moved to said second position, is so configured as to have a side surface thereof engage a middle finger lying below said strobe light emitting section to aid said middle finger in supporting the camera when said gripping section is gripped for photography.

36. A camera having a built-in strobe, comprising:
a camera body;
barrier means movable relative to said camera body between a first position shielding a lens barrel on said camera body when the camera is not in use and a second position exposing said lens barrel to enable a photographing operation;
a release operating member arranged on said camera body and being movable, when said lens barrel is exposed, to initiate a photographing operation;
a strobe light emitting section provided on said barrier means for irradiating a subject to be photographed; and
said release button being positioned immediately above said strobe light emitting section;
said strobe light emitting section, release operating member and gripping section extending in a straight line aligned with a vertical direction of the camera; and
a projection provided on said barrier means and extending about said strobe light emitting section, said projection extending in a direction away from a front face of said barrier means for displacing a finger engaging said projection away from said front face to aid in preventing said finger from covering said strobe light emitting section to avoid an interruption of light emitted therefrom.

37. A camera with a built-in strobe according to claim 36, wherein said strobe light emitting section is located at an end of said barrier means; and said projection projects outwardly and away from said barrier means while surrounding an outer circumference of said strobe light emitting section.

38. A camera with a built-in strobe according to claim 37, wherein said projection is formed as part of said barrier means.

39. A camera with a built-in strobe according to claim 37, wherein a gripping section formed in said barrier means includes a concave portion extending from said strobe and said projection along the optical axis so that a user can grip the gripping section easily.

40. A camera with a built-in strobe according to claim 39, wherein said release member is located on a top of the camera housing; and when said gripping section is gripped with an index finger resting on said release member, a middle finger lying below said strobe light emitting section is in contact with a bottom of said projection of said barrier means to aid in support of the camera.

41. A camera with a built-in strobe according to claim 36, wherein said barrier means is connected to a switching means, and turns off said switching means when covering at least said lens barrel and photography is not performed, and turns on said switching means when exposing said lens barrel and photography is performed.

42. A camera having a built-in strobe according to claim 36, wherein said strobe light emitting section is spaced from an optical axis of said photographing optical system and wherein a portion of said projection terminates in a surface which extends inwardly toward a front face of said barrier means and which is substantially perpendicular to said barrier means front face to provide a surface for engaging a middle finger holding the gripping section of the barrier means to aid the middle finger in support of the camera and to aid in preventing the middle finger from overlying the strobe light emitting section.

43. A camera with a built-in strobe, comprising:
a camera housing;
an optical system installed in said camera housing;
a gripping section formed at an end of said camera housing;
a strobe installed on a front of the camera in one end of said gripping section;
a release member installed above said strobe and on a top of said camera housing;
said gripping section extends in a direction that does not cross the optical axis of said optical system and in a substantially vertical direction of the camera which is substantially perpendicular to an optical axis of said optical system;
said gripping section of said camera housing being laid out in such a manner that one of a cartridge chamber and a spool chamber is located in a back portion of said camera housing, battery storage means is located in front of one of said cartridge chamber and said spool chamber, a strobe substrate is located on said battery storage means, a capacitor is located under said strobe substrate with a terminal attached thereto, and said strobe is located on said strobe substrate.

44. A camera having a built-in strobe, comprising:
a camera housing having top and bottom ends, left and right-hand ends, and front and rear faces terminating in said top and bottom ends and said left and right-hand ends;
a taking lens including a lens barrel arranged to project forwardly from said front face and being positioned intermediate said left and right ends and said top and bottom ends;
a camera gripping section deviating from a flat face of said camera housing and extending over a portion of said right-hand end and an adjacent portion of said front face, said camera gripping section extending between said top end and said bottom end;
a release member provided along said top end and directly above a portion of the gripping section extending along said front face;
said release member being operable to initiate a photographing operation; and
strobe means including a strobe light emitting section arranged along said front face between said release member and said gripping section.

45. A camera with a built-in strobe, comprising:
a camera body;
a photographing optical system located substantially at a central portion of said camera body which has first and second lateral ends on opposite sides of said optical system;
a camera gripping section deviating from a flat front face of said camera body and arranged along one of said lateral ends and a portion of a front surface of said camera body adjacent to said one of said lateral ends;
a release member arranged directly above said gripping section and being movable to initiate a photographing operation; and a strobe light emitting section arranged between said gripping section and said release member whereby a finger of a hand holding said gripping section and resting on said release member and an adjacent finger of said hand resting on a portion of said gripping section closer to said release member are separated by a distance which assures that said light emitting section is not covered by said adjacent fingers.

46. A camera having a built-in strobe, comprising:
a photographing optical system located substantially at a central portion of a camera body having lateral portions extending on opposite sides of said optical system;
a camera gripping section deviating from a flat front face of said camera body formed on one of the lateral portions of said camera body and a portion of a front surface of the camera body adjacent said one of said lateral portions, said gripping section extending in a direction from a bottom end of said camera body to a top end and along a line which extends in a direction which does not intersect with an optical axis of said optical system;
a release member arranged above said gripping section so that said line extends through said release member, said release member being movable to initiate a photographing operation;
a strobe light emitting section arranged between said gripping section and said release member; and
a projecting member having a convex tapered portion for displacing a finger resting on said projecting member from engaging a smooth curved contour of said camera body adjacent to said tapered portion to aid in preventing such finger from overlying said strobe light emitting section.

47. A camera with a built-in strobe according to claim 46 wherein said projecting member is movable between a first position which covers said strobe light emitting section when the camera is not in use and a second position which uncovers said strobe light emitting section when the camera is in a condition ready for performing a photographing operation, said projecting member in said second position displacing said finger from a smooth curved contour of said camera body when said finger overlies said projecting member.

48. A camera having a built-in strobe according to claim 49 further comprising:
a main camera switch operated by said projecting member and being turned off when said projecting member is in said first position and being turned on when said projecting member is in said second position.

49. A camera having a built-in strobe according to claim 47 wherein said projecting member has a portion which overlies at least a portion of a camera finder when said projecting member is in said first position causing said projecting portion to be viewable through said camera finder and being displaced from and out of a field of view of said camera finder when in said second position.

50. A camera having a built-in strobe according to claim 49 wherein said camera finder has a finder optical system arranged between said photographing optical system and said gripping section.

51. A camera having a built-in strobe, comprising:
a camera body;
a patrone chamber formed in a first lateral portion of said camera body and extending in a direction parallel to a first end of a camera adjacent said first lateral portion;
a spool chamber formed in a second lateral portion of said camera body opposite from said first lateral portion and said patrone chamber, said spool chamber and patrone chamber being arranged substantially parallel to one another;
a strobe means located immediately above one of said patrone chamber and said spool chamber and beneath an upper surface of said camera body; a release member arranged along said upper surface and directly above said strobe light emitting section; and
a strobe protecting member arranged adjacent said strobe light emitting section and having an end portion projecting away from said camera body for displacing a finger resting on said projecting portion from said camera body to aid in preventing such finger covering said strobe light emitting section.

52. A camera having a built-in strobe, comprising:
a photographing optical system located substantially at a central portion of a camera body;
a camera gripping section deviating from a flat front face of said camera body and formed in a first lateral end of said camera body and a portion of a front surface of said camera body adjacent said first lateral end, said camera gripping section extending in a direction parallel to said first lateral end and so that a line representing said direction does not intersect with an optical axis of said photographing optical image;
a release member arranged on a top end of said camera overlying said first lateral end, said release member being movable to initiate a photographing operation;
a strobe light emitting section arranged between said gripping section and said release member; and
a strobe light protecting member having a tapered projecting portion for displacing a finger overlying said projecting portion from a smooth camera contour for resting said finger to aid in preventing said finger from overlying and interrupting light emission of said strobe light emitting section.

53. A camera having a built-in strobe unit, comprising:
a photographing optical system arranged in a camera body;
a release member arranged along a top end of said camera body and being movable for initiating a photographing operation;
a cover member arranged upon a front surface of said camera body and movable between a first position covering said photographing optical system and a second position uncovering said photographing optical system; and
a strobe light emitting section provided on said movable cover member and located directly below said release member when said cover member is in said second position.

54. A camera with a built-in strobe according to claim 53 wherein said strobe light emitting section is located in an upper portion of said movable cover member and is positioned between said photographing optical system and an upper end of said camera and is substantially directly above said optical system when said cover is in said first position.

55. A camera with a built-in strobe according to claim 54 wherein said cover member is provided with a finger gripping section directly beneath said strobe light emitting section which is recessed relative to said strobe light emitting section and is provided with a projecting portion which displaces a finger engaging said projecting portion away from said cover member to aid in preventing said finger from covering said strobe light emitting section.

* * * * *